March 12, 1963 J. F. PURDY 3,081,216
METHOD AND APPARATUS FOR MAKING CORD PLIES FOR TIRES
Filed March 21, 1960 2 Sheets-Sheet 1
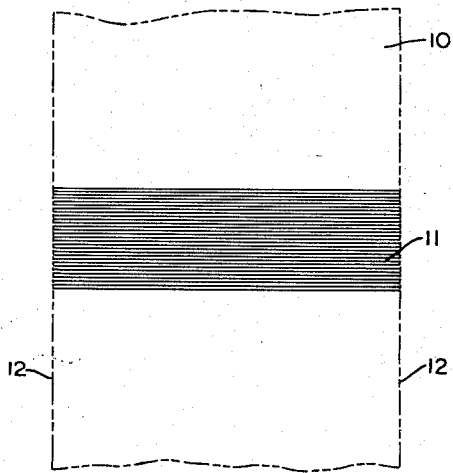
FIG. 1
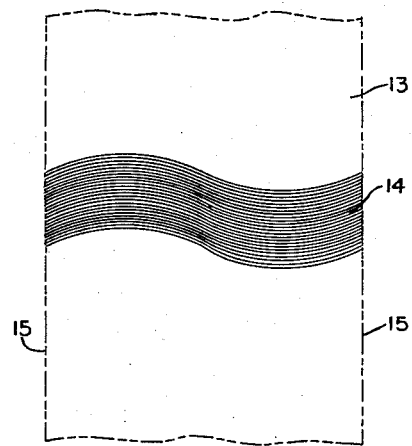
FIG. 2
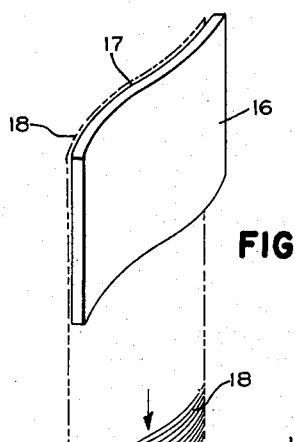
FIG. 3
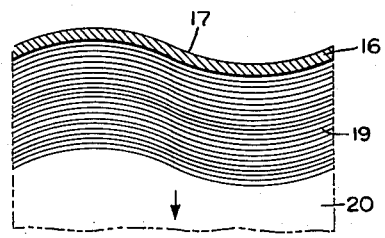
FIG. 4
INVENTOR.
JOHN F. PURDY
BY
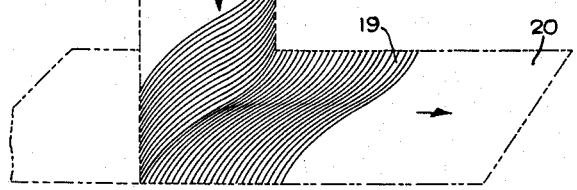
ATTORNEY March 12, 1963  J. F. PURDY  3,081,216
METHOD AND APPARATUS FOR MAKING CORD PLIES FOR TIRES
Filed March 21, 1960  2 Sheets-Sheet 2

INVENTOR.
JOHN F. PURDY
BY
ATTORNEY

United States Patent Office 3,081,216
Patented Mar. 12, 1963

3,081,216
METHOD AND APPARATUS FOR MAKING CORD PLIES FOR TIRES
John F. Purdy, Cuyahoga Falls, Ohio, assignor to The Goodyear Tire & Rubber Company, Akron, Ohio, a corporation of Ohio
Filed Mar. 21, 1960, Ser. No. 16,563
10 Claims. (Cl. 156—296)

This invention relates to an improved method and apparatus for making cord plies for tires, and more particularly, relates to a method and apparatus for laying cords in any prescribed or desired cord path extending transversely of the ply.

The invention contemplates the provision of a method and apparatus for laying tire cords in a prescribed or desired cord path transversely of the ply. In the standard or conventional method of making tire plies a web of cords is cut on a bias transversely of the length of the cords and the plies of material are then assembled into a web in which the cords extend linearly across the width of the web. Tire carcasses are then built from this so-called "bias" cut fabric and, prior to shaping of the tire carcasses, the cords extend linearly from one bead of the tire to the other. During the shaping operation, however, the cords pantograph with respect to each other and assume a so-called "conventional" cord path in the shaped tire in which the cord angle continuously varies along its length from a relatively large angle at the bead area of the shaped carcass to a smaller angle at the crown of the shaped carcass. It is emphasized that this conventional cord path in the shaped carcass results from cords extending linearly transversely of the plies.

It has been well known for many years that desirable characteristics would result from building tires in which the cord paths in the finished tires extend along paths other than conventional cord paths. For example, it is well known that a geodesic cord path, which is the shortest path between a point on one bead to a given point on the other bead of the carcass, produces zero shear stresses between the plies of the tire. In a geodesic cord path the bead of the tire is relatively small and increases toward the crown of the tire.

Other unique cord paths have been devised which result in certain unique properties exhibited in the completed tire. Certain of these cord paths extend curvilinearly across the web or ply of tire fabric prior to incorporation into the tire carcass, whereas, others extend partly linearly and partly curvilinearly transversely across the web.

It is an object of this invention to provide a method and apparatus for rapidly and efficiently producing a flat ply of tire fabric made of cords which extend transversely of the ply in any prescribed or desired cord path.

It is a further object of the invention to provide a method and apparatus for rapidly and continuously converting bias cut fabric, in which the cords extend linearly transversely of the ply, into a flat ply in which the cords extend in a cord path in a different direction linearly transversely of the web or in a curvilinear direction transversely across the web.

The manner in which the invention accomplishes the foregoing obejcts, as well as additional objects and advantages, will be more apparent from a reading of the following detailed description of the invention, in conjunction with reference to the accompanying drawings herein.

FIG. 1 is a plan view of a tire cord fabric web in which the cords extend at right angles to the edges of the web.

FIG. 2 is a plan view of the web of material shown in FIG. 1 which has been processed according to this invention.

FIG. 3 is a plan view showing schematically the method of this invention.

FIG. 4 is a plan view of FIG. 3 which parts in cross section.

Figure 5:
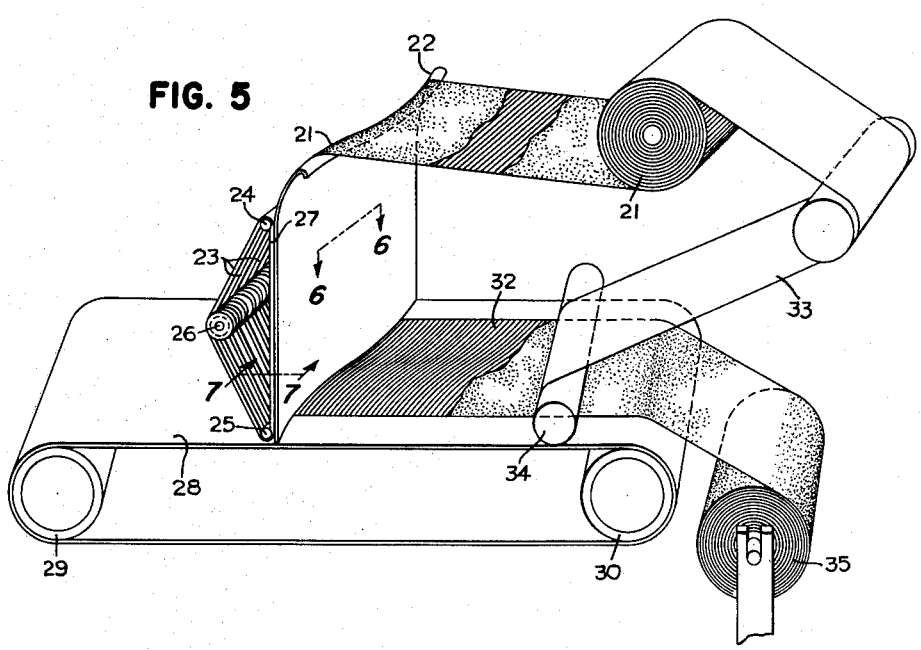
FIG. 5 is an isometric view showing schematically an apparatus for performing the method of this invention.
Figure 6:
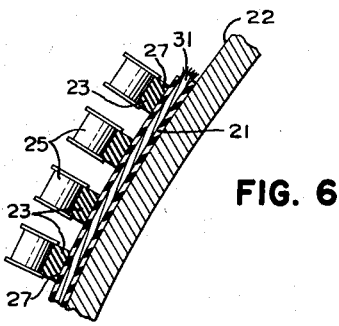
FIG. 6 is a partial enlarged sectional view, taken along the lines 6, 6 of FIG. 5.

Referring to the drawings, FIG. 1 shows a plan view of a continuous web 10 having cords 11 extending at right angles to the edges 12 of the ply 10, and, in accordance with conventional practice, the web of cords is coated with a thin layer of gum rubber. In accordance with this invention the web or ply 10 of the cord fabric is converted into a flat ply 13 shown in FIG. 2 in which each of the cords 14 extend in a cord path other than the cord path of the ply 10. For purposes of illustration, the cord path in FIG. 2 extends in an S-shaped path transversely of the edges 15 of the ply 13.

In accordance with this invention, in order to produce a ply 13 from the ply 10, each of the cords 11 in the ply 10 are first curved or shaped into a path identical with the cords 14 of the ply 13 by moving each cord into a plane normal to the web 10. Preferably, this step in the method is performed by placing the ply 10 on a surface or table 16 having a surface 17 which is curved in an identical manner transversely of the table 16 as the cord path of the cords 14. The surface 17 is, therefore, merely a curvilinear surface generated by a curvilinear generatrix having a path identical to the cord 14 which is moved parallel to the length of the table 16. By laying or disposing the web 10 against the surface 17 it is seen that each of the cords 11 are curved or warped in a plane normal to the web 10, and each of the cords in the resulting curved web 18 lie in a path identical to the curvature of the surface 17 and in mutually parallel planes, all of which are parallel to the surface 19. Further, in accordance with this invention, the curved web 18 is moved longitudinally of the surface 17 and each cord 19 is successively moved from the curved ply 18 onto a flat plane 19 which preferably is a conveyor belt which moves at an identical speed to the speed of the curved ply 18. It is seen then that the cords are each successively transposed from the curved ply 18 into a flat ply 20 in which cords extend transversely of the ply 20 in mutually parallel relationship and in a cord path identical to the path of the generatrix of the surface 17 which, in turn, is identical to that of the path 14 desired in the finished web.

Figure 7:
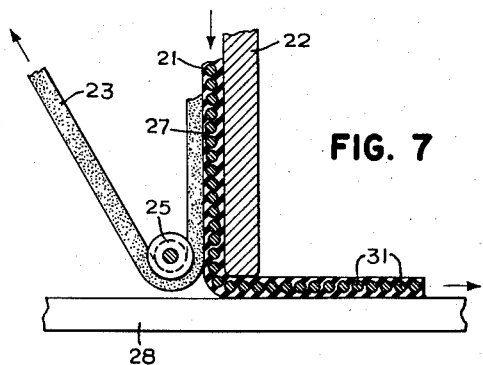
FIG. 7 is a partial enlarged sectional view taken along the lines 7, 7 of FIG. 5.

FIG. 5 discloses an apparatus for performing the method of this invention in a continuous manner. A roll of rubber coated ply material 21, in which the cords extend at right angles to the edges of the ply 21 is suitably supported so that the web or ply 21 may be continuously fed longitudinally of the curved surface 22 which is constructed and curved in the manner described with respect to table 16. The web 21 is maintained in engagement with the surface 22 and is moved longitudinally of surface 22 by means of a series of belts 23 which are suitably supported on axles 24 and 25 and driven by pulley 26. The belts 23 are all of varying lengths depending upon the position of the driving portion 27 thereof transversely of the surface 22 but each of the belts is driven by the same pulley 26 so that the linear speed of the belt is identical. It is seen then that ply 21 passes between the surface 22 and the portion 27 of the belts in a manner such that the cords in the ply 21 move longitudinally of the surface 22 and into engagement with the belt 28 with the complete length of each cord positioned in a plane parallel to the belt 28. The belt 28 is suitably supported on a drive pulley 29 and idler pulley 30 and is driven at a linear speed identical to the linear speed of the belts 23. Referring to FIG. 7 of the drawings, each of the cords 31 approach the belt 28 in a plane parallel to the belt 28 and are then moved in a plane parallel to the belt 28 without changing the path of the cords. The path of the cords 31 existing on the flat ply 32 extend in mutually parallel relationship and in identical cord paths, all of which are in turn identical to that of the generatrix of the surface 22. The web 32 is thereafter provided with a suitable liner 33 by means of a pressure roller 34 and rolled upon itself into a finished roll 35 from which tire carcasses may be built in the usual manner.

While certain representative embodiments and details have been shown for the purpose of illustrating the invention, it will be apparent to those skilled in this art that various changes and modifications may be made therein without departing from the spirit or scope of the invention.

What is claimed is:

1. A method of forming a web of cord fabric in which the cords extend transversely of the web in any prescribed path in mutually parallel relationship comprising, forming a web of parallel cords extending in straight paths transversely of the web, transversely curving said web in a direction normal to the plane of the web and thereby changing the direction of the path of each individual cord, and moving each individual cord successively from the plane of said curved web into a flat plane extending parallel to the generatrix of said curved web whereby each cord extends in a curved path transversely of the length of the web and in which each cord lies wholly within said flat plane in mutually parallel relationship.

2. A method of forming a web of cord fabric in which the cords extend transversely of the web in any prescribed path in mutually parallel relationship comprising, forming a web of parallel cords extending in straight paths transversely of the web, transversely curving said web in a direction normal to the plane of the web while maintaining the cords in parallel relationship with respect to each other so that each cord describes an identical cord path, and moving each individual cord successively from the plane of said curved web into a flat plane extending parallel to the generatrix of said curved web whereby each cord extends in a curved path identical to the curvature of said curved web and in which each cord lies wholly within said flat plane in mutually parallel relationship.

3. A method of forming a web of cord fabric in which the cords extend transversely of the web in any prescribed path in mutually parallel relationship comprising, forming a web of parallel cords extending in straight paths transversely of the length of the web, curving said web in a direction normal to the plane of the web so that each cord maintains a parallel relationship with respect to every other cord and extends in a curved path identical to the curvature of said web, and moving each individual cord successively from said curved web into a flat web extending parallel to the generatrix of said curved web whereby each cord extends in a curved path transversely of the length of the web and lies wholly within the plane of said web.

4. A method of forming a web of cord fabric in which the cords extend transversely of the web in any prescribed path in mutually parallel relationship comprising, forming a web of parallel cords extending in straight paths transversely of the length of the web, moving said web parallel to and in contact with a curved surface which is generated by a line generatrix having a curvature similar to the desired path of the cords in the final web, the movement of the web along said curved surface being parallel to said curved surface, thereafter, moving each individual cord successively from the plane of said curved surface into a flat plane extending parallel to the generatrix of said surface whereby each cord extends in a curved path transversely of the web and lies wholly within said flat plane in mutually parallel relationship.

5. A method as claimed in claim 4 in which said cords are held in engagement with said curved surface by a movable means which moves the cords along said curved surface at a rate of speed identical to that at which the cords are moved into said flat plane.

6. A method as claimed in claim 5 in which said curved surface is disposed in a plane normal to a conveyor belt and said cords are moved along said curved surface by a movable means engaging one side of said web.

7. A method as claimed in claim 6 in which said movable means maintains each of the cords in equal and uniformly spaced parallel relationship during movement relative to said curved surface.

8. An apparatus for forming a web of cord fabric in which the cords extend transversely of the web in any prescribed path and in mutually parallel relationship comprising, a stationary curved surface contacting and curving a web of parallel cords which initially extend in straight paths transversely of the web, said surface being generated by a line generatrix having a curvature similar to the curved path desired of the cords in the final web, means for holding said cords against said curved surface and for moving the cords relative to said curving means, and conveyor means extending in a flat plane parallel to the curved cords for successively moving each of the cords into said plane.

9. An apparatus as claimed in claim 8 in which at least one movable belt engages the side of the web opposite from that side engaging said curving means for moving the web relative to said curving means at a uniform speed.

10. An apparatus as claimed in claim 9 in which said belt moves at the same rate of speed across said curving means as said conveyor means.

References Cited in the file of this patent

UNITED STATES PATENTS

| | | |
|---|---|---|
| 1,077,125 | Doughty | Oct. 28, 1913 |
| 1,712,338 | Evans | May 7, 1929 |
| 2,285,447 | Lichter | June 9, 1942 |
| 2,638,146 | Rounseville | May 12, 1953 |
| 2,638,656 | Tuttle | May 19, 1953 |
| 2,758,048 | Ceretti | Aug. 7, 1956 |